(12) United States Patent
Yeom

(10) Patent No.: US 11,381,459 B2
(45) Date of Patent: Jul. 5, 2022

(54) SERVICE PROVIDING SYSTEM AND METHOD FOR PREVENTING HIDDEN CAMERA, SERVICE PROVIDING APPARATUS THEREFOR, AND NON-TRANSITORY COMPUTER READABLE MEDIUM HAVING COMPUTER PROGRAM RECORDED THEREON

(71) Applicant: SK Planet Co., Ltd., Seongnam-si (KR)

(72) Inventor: GyuYoung Yeom, Seoul (KR)

(73) Assignee: SK PLANET CO., LTD., Seongnam-si (KR)

(*) Notice: Subject to any disclaimer, the term of this patent is extended or adjusted under 35 U.S.C. 154(b) by 0 days.

(21) Appl. No.: 16/945,230

(22) Filed: Jul. 31, 2020

(65) Prior Publication Data
US 2021/0044485 A1 Feb. 11, 2021

(30) Foreign Application Priority Data

Aug. 5, 2019 (KR) .......... 10-2019-0094841
Oct. 15, 2019 (KR) .......... 10-2019-0127962

(51) Int. Cl.
*H04L 41/12* (2022.01)
*H04L 67/143* (2022.01)
*H04L 43/04* (2022.01)

(52) U.S. Cl.
CPC .......... *H04L 41/12* (2013.01); *H04L 43/04* (2013.01); *H04L 67/143* (2013.01)

(58) Field of Classification Search
CPC ..... G07C 9/00904; H04L 41/12; H04L 43/04; H04L 67/143; H04L 67/145;
(Continued)

(56) References Cited

U.S. PATENT DOCUMENTS 7,185,368 B2* 2/2007 Copeland, III ..... H04L 63/1408
709/227
7,290,283 B2* 10/2007 Copeland, III ..... H04L 63/0263
709/227

(Continued)

FOREIGN PATENT DOCUMENTS

JP 2006/332997 A 12/2006
JP 2015/095091 A 5/2015

OTHER PUBLICATIONS

Yushi Cheng Xiaoyu Ji Tianyang Lu Wenyuan Xu, Print Publication Date: Feb. 20, 2019, IEEE Transactions on Mobile Computing, vol. 19, No. 4, pp. 907-921, Apr. 1, 2020, doi: 10.1109/TMC.2019. 2900919,Print ISSN: 1536-1233 Electronic ISSN: 1558-0660 CD: 2161-9875 (Year: 2019).*

*Primary Examiner* — Greg C Bengzon
(74) *Attorney, Agent, or Firm* — Fenwick & West LLP

(57) ABSTRACT

The present invention relates to service providing system and method for preventing a hidden camera, a service providing apparatus therefor, and a non-transitory computer readable medium having a computer program recorded thereon, and more particularly, to service providing system and method for preventing a hidden camera, a service providing apparatus therefor, and a non-transitory computer readable medium having a computer program recorded thereon which configures a relay device connected to a network in a building for detecting a hidden camera in the interior of the building, easily detects the hidden camera by analyzing a connection state of the hidden camera connected to the corresponding relay device, and then blocks the network connection of the corresponding hidden camera.

8 Claims, 6 Drawing Sheets

(58) Field of Classification Search
CPC ... H04L 67/146; H04L 67/12; H04L 12/2807; H04L 12/2809; H04L 12/2825; H04L 12/2827; H04L 41/0843; H04L 41/0853; H04L 41/0866; H04L 41/142; H04L 41/145; H04L 41/147; H04L 41/16; H04L 43/026; H04L 43/045; H04L 43/062; H04L 43/065; H04L 43/0817; H04L 43/10; H04L 43/12; H04L 61/103; H04L 63/0263; H04L 63/0281; H04L 63/101; H04L 63/102; H04L 63/107; H04L 63/108; H04L 63/1408; H04L 63/1416; H04L 63/1425; H04L 63/1441; H04L 63/1475; H04L 63/1483; H04L 63/302; H04L 63/304; H04L 63/306; H04L 63/308; H04L 63/1491; H04L 67/1061; H04L 67/1063; H04L 67/1065; H04L 67/1068; H04L 67/16; H04L 63/08; H04L 12/2803; H04L 63/20; H04L 12/2829; H04L 41/0806; H04L 47/72; H04L 69/22; H04L 69/191; H04L 69/16; H04N 21/4131; H04N 21/435; H04N 21/44008; H04N 21/478; H04N 21/4882; H04N 21/8133; H04N 7/18; H04N 7/181; H04N 21/44213; H04N 21/44218; H04N 21/485; H04N 21/658; H04N 21/25816; H04N 21/472; H04W 12/082; H04W 28/04; H04W 48/08; H04W 4/70; H04W 60/00; H04W 76/14; H04W 76/16; H04W 84/18; H04W 88/06; H04W 88/18; H04W 8/005; H04W 8/18; H04W 12/12; H04W 12/122; H04W 12/63; H04W 12/65; H04W 12/79; H04W 4/023; H04W 4/21; H04W 84/12; H04W 4/80; H04W 12/033; H04W 12/06; H04W 12/08; H04W 12/088; H04W 12/35; H04W 12/67; H04W 4/027; H04W 4/90; H04W 84/045; G08B 25/003; G08B 13/19645; G08B 13/19656; G08B 13/19682; G08B 13/19684; G08B 15/00; G08B 25/006; G08B 27/003; G08B 29/02; G06Q 10/02; G06Q 50/12; H04M 1/72454; H04M 1/72463

See application file for complete search history.

(56) References Cited

U.S. PATENT DOCUMENTS

| | | | | |
|---|---|---|---|---|
| 7,644,151 B2* | 1/2010 | Jerrim | ............ | H04L 43/026 709/227 |
| 7,886,358 B2* | 2/2011 | Copeland, III | ......... | H04L 41/50 713/168 |
| 8,629,755 B2* | 1/2014 | Hashim-Waris | ... | G06Q 30/0601 705/13 |
| 9,106,650 B2* | 8/2015 | Roesner | ............ | G06F 21/6281 |
| 10,326,921 B2* | 6/2019 | Chien | ............ | G01J 5/025 |
| 2001/0016824 A1* | 8/2001 | Matsushima | .......... | G06Q 10/02 705/5 |
| 2001/0041987 A1* | 11/2001 | Ichikawa | ........... | H04N 1/00278 194/205 |
| 2004/0147255 A1* | 7/2004 | Lee | ............ | H04W 12/082 455/435.2 |
| 2005/0075117 A1* | 4/2005 | Jang | ............ | H04M 1/72463 455/556.1 |
| 2007/0180526 A1* | 8/2007 | Copeland, III | ..... | H04L 63/1416 709/224 |
| 2007/0199076 A1* | 8/2007 | Rensin | ............ | H04N 7/147 726/27 |
| 2007/0268121 A1* | 11/2007 | Vasefi | ............ | H04N 7/181 348/E7.086 |
| 2007/0289017 A1* | 12/2007 | Copeland, III | ..... | H04L 63/1416 709/224 |
| 2008/0024605 A1* | 1/2008 | Osann | ............ | G08B 13/19695 348/143 |
| 2009/0249497 A1* | 10/2009 | Fitzgerald | ............ | H04W 12/12 726/34 |
| 2010/0138535 A1* | 6/2010 | Jerrim | ............ | H04L 63/1416 709/227 |
| 2010/0141762 A1* | 6/2010 | Siann | ............ | H04N 5/23206 348/372 |
| 2013/0031600 A1* | 1/2013 | Luna | ............ | H04W 12/128 726/1 |
| 2015/0124100 A1* | 5/2015 | McRory | ............ | H04N 7/185 348/151 |
| 2016/0092864 A1* | 3/2016 | Evans | ............ | H04W 4/02 705/40 |
| 2016/0105598 A1* | 4/2016 | Zeira | ............ | H04N 5/2252 348/143 |
| 2016/0105814 A1* | 4/2016 | Hurst | ............ | H04W 24/08 370/252 |
| 2016/0134932 A1* | 5/2016 | Karp | ............ | H04L 67/1097 348/207.11 |
| 2016/0197842 A1* | 7/2016 | Nishimura | ............ | G06Q 30/06 709/204 |
| 2017/0155970 A1* | 6/2017 | Cao | ............ | H04L 67/36 |
| 2017/0303094 A1* | 10/2017 | Collar | ............ | H04L 41/069 |
| 2018/0006912 A1* | 1/2018 | Sokolik | ............ | H04L 43/062 |
| 2018/0115686 A1* | 4/2018 | Carpenter | ............ | H04R 1/028 |
| 2018/0176503 A1* | 6/2018 | Kogata | ............ | H04N 7/183 |
| 2018/0191775 A1* | 7/2018 | Watson | ............ | H04L 67/12 |
| 2018/0288126 A1* | 10/2018 | Smart | ............ | H04L 43/08 |
| 2018/0309775 A1* | 10/2018 | Zou | ............ | H04L 63/1425 |
| 2018/0341835 A1* | 11/2018 | Siminoff | ............ | G06V 10/751 |
| 2018/0359811 A1* | 12/2018 | Verzun | ............ | H04W 88/16 |
| 2018/0367543 A1* | 12/2018 | Warrick | ............ | H04L 63/102 |
| 2019/0253670 A1* | 8/2019 | Chien | ............ | H04N 5/2256 |
| 2019/0260786 A1* | 8/2019 | Dunn | ............ | H04L 67/12 |
| 2019/0266817 A1* | 8/2019 | Lucy | ............ | G08B 13/2491 |
| 2019/0274208 A1* | 9/2019 | Zeira | ............ | H04Q 9/00 |
| 2019/0306720 A1* | 10/2019 | Nakarmi | ............ | H04L 63/14 |
| 2019/0356550 A1* | 11/2019 | Stanciu | ............ | H04L 41/12 |
| 2019/0394220 A1* | 12/2019 | Gupta | ............ | G06K 9/6267 |
| 2020/0007252 A1* | 1/2020 | Wang | ............ | H04H 60/23 |
| 2020/0067971 A1* | 2/2020 | Chiu | ............ | H04L 41/142 |
| 2020/0280568 A1* | 9/2020 | Brats | ............ | H04L 63/1416 |
| 2020/0344238 A1* | 10/2020 | Ainsworth | ............ | G06Q 10/00 |
| 2020/0371742 A1* | 11/2020 | Deros | ............ | H04R 1/08 |
| 2021/0037497 A1* | 2/2021 | Rueckert | ............ | H04W 60/00 |
| 2021/0217293 A1* | 7/2021 | Harris | ............ | H04W 4/90 |

* cited by examiner

SERVICE PROVIDING SYSTEM AND METHOD FOR PREVENTING HIDDEN CAMERA, SERVICE PROVIDING APPARATUS THEREFOR, AND NON-TRANSITORY COMPUTER READABLE MEDIUM HAVING COMPUTER PROGRAM RECORDED THEREON

CROSS-REFERENCE TO RELATED APPLICATIONS

This application claims the priority of Korean Patent Application Nos. 10-2019-0094841 filed on Aug. 5, 2019 and 10-2019-0127962 filed on Oct. 15, 2019, in the Korean Intellectual Property Office, which are incorporated by reference herein in their entirety.

BACKGROUND OF THE INVENTION

Field of the Invention

The present invention relates to service providing system and method for preventing a hidden camera, a service providing apparatus therefor, and a non-transitory computer readable medium having a computer program recorded thereon, and more particularly, to service providing system and method for preventing a hidden camera, a service providing apparatus therefor, and a non-transitory computer readable medium having a computer program recorded thereon which configures a relay device connected to a network in a building for detecting a hidden camera in the interior of the building, easily detects the hidden camera by analyzing a connection state of the hidden camera connected to the corresponding relay device, and then blocks the network connection of the corresponding hidden camera.

Description of the Related Art

Currently, the installation of hidden cameras for illegally capturing images has emerged as a social problem, and these hidden cameras have been improved in quality and performance to be able to produce high-quality images even in a compact size that is difficult to be detected with the naked eyes when installed indoors.

The images in the rooms of accommodations that are illegally captured and distributed through these hidden cameras not only cause irreversible wounds to victims, but also adversely affect the accommodation industry.

Recently, various detection methods have appeared for the detection of these hidden cameras, and as examples for the methods for detecting these hidden camera, there are an infrared method for detecting light reflected by a lens surface of the hidden camera by irradiating strong light and an RF method for measuring and detecting an electromagnetic wave strength by approaching an electromagnetic wave detection device to a location where the hidden camera is suspected to be installed.

However, the infrared method has a problem that it is difficult to detect the hidden camera when the lens of the camera is coated, and the RF method that detects the hidden camera by measuring the intensity of an RF signal emitted from the hidden camera has a limited problem even in a detection range in that the detection capability is deteriorated due to a surrounding environment full of electronic equipment because a detection antenna needs to be closer to the suspected location one by one.

That is, in the existing detection method, since the detectable range is narrow, there is an inconvenience in that the equipment for detection of the hidden camera needs to be accurately detected in units of the detectable range manually, and since the accuracy is also not high, there is a problem in that the detection of the hidden camera is frequently failed and thus reliability is deteriorated.

In addition, since it is common to operate at least a few dozen rooms in the case of a building for accommodation, both the infrared method and the RF method, which need to be closely observed and detected in a narrow point unit for every room for the detection of the hidden camera one by one, are low realistic methods, but in addition to these methods, efficient and effective methods for detecting the hidden camera have not yet been implemented.

The above-described technical configuration is a background technique for assisting the understanding of the present invention, and does not mean a conventional technology widely known in the art to which the present invention belongs.

SUMMARY OF THE INVENTION

An object of the present invention is to enhance convenience and accuracy for detection of a hidden camera as compared with existing detection methods in which accuracy is decreased even while taking an effort of manual detection by using equipment for detecting the hidden camera, by supporting the hidden camera to be easily detected by analyzing connection information of the hidden camera connected to a network configured in a building to transmit an image captured by the hidden camera installed in the building to an external device via the network.

Another object of the present invention is to support a hidden camera to be rapidly and accurately detected with respect to a plurality of rooms configured in a building operated in an accommodation industry by supporting the hidden camera to be detected according to connection information of the hidden camera.

According to an embodiment of the present invention, there is provided a service providing method for preventing a hidden camera of a service providing apparatus communicating with a relay device which is disposed in the interior of a building to relay a communication network connection via a communication network, the service providing method comprising: a collection step of receiving and collecting detection information including connection information of a user device connected to the relay device and identification information of the relay device periodically or in real time from the relay device; a determination step of comparing the identification information of the user device included in the connection information according to the detection information with registration information by one or more exception devices pre-registered as a device other than a hidden camera for the building to determine whether the user device corresponds to the exception device; and a detection step of calculating traffic generated by the user device or a connection maintenance time of the user device based on the connection information for each detection information collected for the user device in the collection step when the user device does not correspond to the exception device in the determination step and then calculating a determining result by applying the calculated traffic or connection maintenance time to a predetermined determination reference to detect the hidden camera, and detecting whether the user device corresponds to the hidden camera according to the determining result.

As an example of the present invention, the service providing method may further comprise transmitting control information for blocking the connection of the user device to the relay device when the user device corresponds to the hidden camera in the detection step.

As an example of the present invention, the relay device may be a gateway or an AP.

As an example of the present invention, the detection step may include detecting whether the user device corresponds to the hidden camera based on a setting time which is predetermined in response to the relay device or received or set from an external device and the connection maintenance time of the user device according to the connection information for each detection information collected for the user device in the collection step or calculating average traffic generated by the user device based on the traffic included in the connection information for each detection information and then detecting whether the user device corresponds to the hidden camera according to whether the average traffic exceeds a predetermined reference value.

As an example of the present invention, the building may be a building including a plurality of rooms for an accommodation industry, a plurality of different relay devices, which are matched with the plurality of rooms one by one and set with different unique passwords for connection authentication, may be arranged in the interior of the building, and an identifier of a specific room where a specific relay device is disposed among the plurality of rooms may be set in registration information of the exception device corresponding to the specific relay device connected by the user device among the plurality of relay devices.

As an example of the present invention, in the detection step, the service providing apparatus may identify an identifier of a specific room where the specific relay device connected by the user device is disposed based on the identification of the specific relay device included in the detection information according to the registration information of the exception device corresponding to the specific relay device and generate alarm information including the identifier of the specific room identified in response to the detection information when detecting the hidden camera to transmit the generated alarm information to one or more terminals predetermined in response to the building.

As an example of the present invention, the detection step may further include detecting the user device as the hidden camera when the connection maintenance time of the user device from an initial connection time to the specific relay device of the user device according to the connection information exceeds a rental time by setting the rental time according to a rental type of a customer who stays in the specific room among the plurality of rooms to the setting time or detecting the user device as the hidden camera when a connection maintenance time of the user device exceeds the rental time, wherein the connection maintenance time is calculated by cumulatively counting connections times according to the connection information included in the detection information whenever receiving the detection information corresponding to the user device base don the detection information by one or more connection devices connected to the specific relay device which is periodically received from the specific relay device.

As an example of the present invention, the external device may be a KIOSK device installed in the building or a manager terminal corresponding to a manager of the building, and before the collection step, the service providing method may further include setting, by the service providing apparatus, a rental time according to the rental type based on rental information or reservation information whenever the rental information for the specific room generated by the external device based on input information input when the customer stays or the reservation information for reserving a room generated by communicating with a customer terminal of the customer is received from the external device.

As an example of the present invention, the collection step may further include generating room status information including the rental information by the plurality of rooms and the connection information for each connection device connected to the relay device matched with the room and output the room status information on one screen by a predetermined output device.

According to another embodiment of the present invention, there is provided a service providing method for preventing a hidden camera of a service providing apparatus communicating with a relay device which is disposed in the interior of a building to relay a communication network connection via a communication network, the service providing method comprising: a collection step of receiving and collecting detection information including connection information of a user device connected to the relay device and identification information of the relay device periodically or in real time from the relay device; a determination step of comparing the identification information of the user device included in the connection information according to the detection information with registration information by one or more exception devices pre-registered as a device other than a hidden camera for the building to determine whether the user device corresponds to the exception device; and an alarming step of calculating traffic generated by the user device or a connection maintenance time of the user device based on the connection information for each detection information collected for the user device in the collection step when the user device does not correspond to the exception device in the determination step and then generating detection information including the traffic or the connection maintenance time and for determining whether the user device corresponds to the hidden camera to transmit the generated detection information to a predetermined terminal.

A non-transitory computer readable medium according to an embodiment of the present invention may record a computer program for functioning a computer to perform the above-described service providing method for preventing the hidden camera.

According to yet another embodiment of the present invention, there is provided a service providing system for preventing a hidden camera of a service providing apparatus communicating with a relay device which is disposed in the interior of a building to relay a communication network connection via a communication network, the service providing system comprising: a relay device configured to generate detection information including connection information of a user device connected to the relay device and identification information of the relay device periodically or in real time to transmit the generated detection information to the service providing apparatus; and the service providing apparatus configured to compare the identification information of the user device included in the connection information according to the detection information with registration information by one or more exception devices pre-registered as a device other than a hidden camera for the building to determine whether the user device corresponds to the exception device, calculate traffic generated by the user device or a connection maintenance time of the user device based on the connection information for each detection information collected from the relay device for the user device when the user device does not correspond to the exception device and then calculate a determining result by applying the calculated traffic or connection maintenance time to a predetermined determination reference to detect the hidden camera, and detect whether the user device corresponds to the hidden camera according to the determining result.

According to still another embodiment of the present invention, there is provided a service providing apparatus for preventing a hidden camera of a service providing apparatus communicating with a relay device which is disposed in the interior of a building to relay a communication network connection via a communication network, the service providing apparatus comprising: a collection unit for receiving and collecting detection information including connection information of a user device connected to the relay device and identification information of the relay device periodically or in real time form the relay device; a determination unit for comparing the identification information of the user device included in the connection information according to the detection information with registration information by one or more exception devices pre-registered as a device other than a hidden camera for the building to determine whether the user device corresponds to the exception device; a detection unit for calculating a connection maintenance time of the user device or traffic generated by the user device according to the connection information for each detection information collected for the user device when the user device does not correspond to the exception device according to the determining result of the determination unit and then detecting whether the user device corresponds to the hidden camera by applying the calculated connection maintenance time or traffic to a predetermined determination reference; and a control unit for transmitting control information for blocking the connection of the user device to the relay device with respect to the user device detected as the hidden camera by the detection unit.

According to the present invention, when the user device corresponding to the hidden camera is connected to the internal network in the building to maintain the connection state unnecessarily or generate a large amount of abnormal traffic, the corresponding user device is detected as the hidden camera, thereby greatly reducing time and cost according to an inefficient detection method of the infrared method and the RF method in which it is necessary to closely observe the inside of the building with a narrow detection range one by one and it is difficult to limit an installation expected range of the hidden camera and supporting the hidden camera to be easily prevented by easily specifying an area where the hidden camera is suspected to be installed and supporting the intensive detection for the corresponding area.

Further, according to the present invention, it is possible to automatically disable the hidden camera by blocking the image transmission of the hidden camera by automatically blocking the connection to the communication network of the user device detected as the hidden camera connected to the relay device in the building, thereby supporting prevention of the hidden camera.

Further, according to the present invention, it is possible to determine a room rental time of a user according to a room rental type of the user, determine that the user deviates from the building while the user device is left in the rental room in the building when the user device maintains the connection state to the specific relay device of the room in the building by exceeding the corresponding room rental time, detect the user device left in the room as the hidden camera by exceeding the room rental time, thereby supporting crimes caused by the hidden camera to be prevented in advance by supporting the hidden camera to be detected and then automatically blocked immediately after the rental time is finished according to the room rental type of the user.

In addition, according to the present invention, it is possible to limit and specify a place where the hidden camera is disposed among the plurality of rooms configuring the building to a specific room based on the detection information for the hidden camera transmitted from the relay device to which the hidden camera is connected. As a result, the service providing apparatus supports the manager to limit and examine an examination range for the hidden camera to one room without the need to examine all rooms in the building, thereby reducing efforts and costs for detecting the hidden camera.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
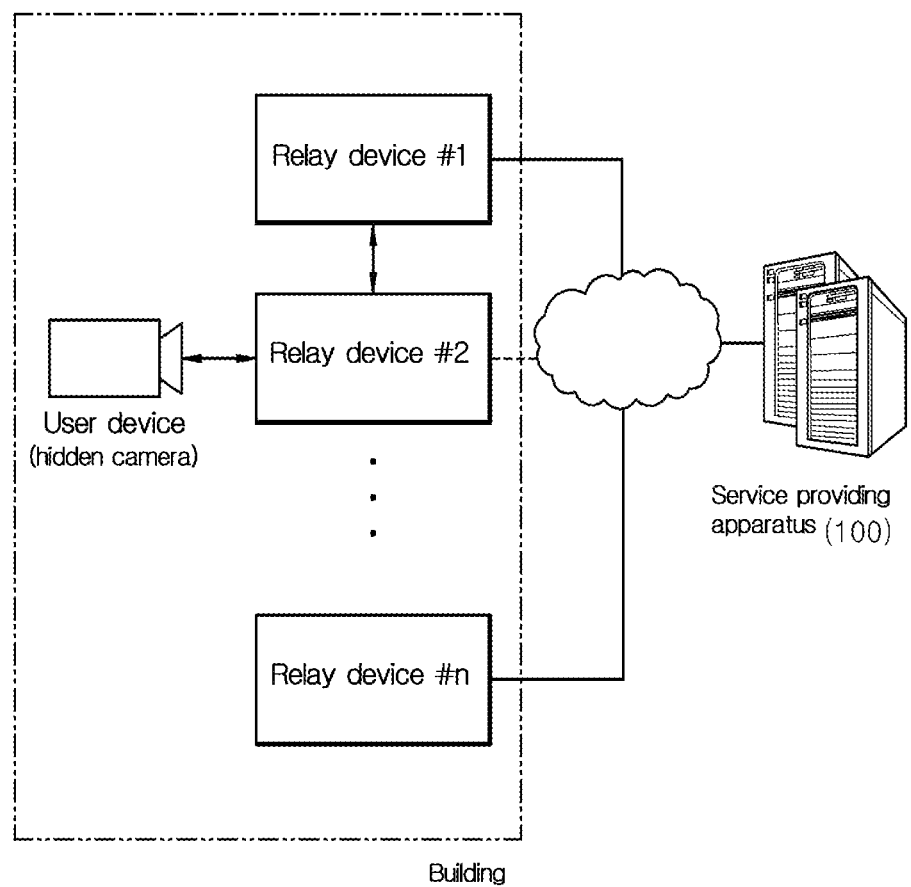
FIG. 1 is a configuration diagram of a service providing system for preventing a hidden camera according to an embodiment of the present invention.

It is noted that technical terms used in the present invention are used to just describe a specific embodiment and do not intend to limit the present invention. Further, unless the technical terms used in the present invention are particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that cannot accurately express the spirit of the present invention, the technical term is substituted by a technical term which can correctly appreciated by those skilled in the art to be appreciated. In addition, general terms used in the present invention should be analyzed as defined in a dictionary or according to front and back contexts and should not be analyzed as an excessively reduced meaning.

Moreover, if singular expression used in the present invention is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second' used in the present invention can be used to describe various components, but the components should not be limited by the terms. The terms are used only for distinguishing one component from the other component. For example, a first component may be named as a second component and similarly, the second component may also be named as the first component without departing from the scope of the present invention.

Hereinafter, preferred embodiments according to the present invention will be described in detail with reference to the accompanying drawings, and like or similar components are denoted by the same reference numerals regardless of a sign of the drawing, and duplicated description thereof will be omitted.

In describing the present invention, when it is determined that detailed description relating to well-known functions or configurations may make the subject matter of the present disclosure unnecessarily ambiguous, the detailed description will be omitted. Further, it is noted that the accompanying drawings are used just for easily appreciating the spirit of the present invention and it should not be analyzed that the spirit of the present invention is limited by the accompanying drawings.

Hereinafter, detailed embodiments of the present invention will be described with reference to the drawings.

FIG. 1 is a configuration diagram of a service providing system for preventing a hidden camera according to an embodiment of the present invention. As illustrated in FIG. 1, the service providing system may be configured to include at least one relay device configured in a building and a service providing apparatus 100 communicating with the relay device via a communication network.

In this case, the service providing system for preventing the hidden camera may be implemented by more components than the components illustrated in FIG. 1, or the service providing system for preventing the hidden camera may be implemented even by fewer components therethan.

The service providing apparatus 100 configured in the service providing system may communicate with a manager terminal corresponding to a manager of the building via the communication network. Here, the manager terminal may be applied with various terminals, such as a smart phone, a portable terminal, a mobile terminal, a personal digital assistant (PDA), a portable multimedia player (PMP) terminal, a telematics terminal, a navigation terminal, a personal computer, a notebook computer, a slate PC, a tablet PC, a ultrabook, a wearable device (for example, including a smartwatch, a smart glass, a head mounted display (HMD), etc.), a Wibro terminal, an Internet protocol television (IPTV) terminal, a smart TV, a digital broadcasting terminal, a television, a 3D television, a home theater system, an audio video navigation (AVN) terminal, an audio/video (A/V) system, and a flexible terminal.

Further, the communication network described in the present invention may include wired/wireless communication networks. Examples of the wireless communication network may include wireless LAN (WLAN), digital living network alliance (DLNA), wireless broadband (Wibro), World Interoperability for Microwave Access (Wimax), GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), IEEE 802.16, long term evolution (LTE), long term evolution-advanced (LTE-A), wireless mobile broadband service (WMBS), 5G mobile communication service, Bluetooth, long range (LoRa), radio frequency identification (RFID), infrared data association (IrDA), UWB (Ultra Wideband), ZigBee, Near Field Communication (NFC), Ultra Sound Communication (USC), Visible Light Communication (VLC), Wi-Fi, Wi-Fi Direct, etc. Further, examples of the wired communication network may include wired local area network (LAN), wired wide area network (WAN), power line communication (PLC), USB communication, Ethernet, serial communication, optical/coaxial cables, etc.

In addition, the communication network described in the present invention is configured in the building and may be configured to include an external network including an Internet network connected to an internal network configured by one or more relay devices and the internal network, and the service providing apparatus 100 may communicate with a specific relay device in the building via the internal network in the building and the external network outside the building.

With the development of the current communication network, most illegal capturing using the hidden camera has been mainly performed by a method of transmitting image information generated by capturing an image by the hidden camera by connecting the hidden camera to the internal network configured in the building to a predetermined device of the outside through the relay device configuring the internal network configured in the building and connecting the corresponding internal network and the Internet network.

Accordingly, the present invention is configured to transmit connection information according to a connection state of the corresponding user device to a predetermined service providing apparatus 100 via the communication network in a relay device connected to a user device when the user device of a user installing the hidden camera in the building is connected to the relay device which is installed in the building to be located in the building and communication-connects the internal network in the building with the Internet network outside the building or is communication-connected to another AP connected via the corresponding Internet network wiredly or wirelessly. The corresponding service providing apparatus 100 operates to detect that the corresponding user installs the user device suspected as the hidden camera in the building when the connection state to the relay device of the user device corresponding to the user is maintained even after the user visiting the building settles his affairs in the building.

At this time, the service providing apparatus 100 may detect the corresponding user device as the device suspected as the hidden camera when an abnormal data amount is generated by the user device based on traffic (data amount) generated by the user device according to the detection information provided by the relay device connected by the user device installed in the building by the user.

In addition, according to the present invention, when the service providing apparatus 100 detects such a hidden camera, the corresponding user device suspected as the hidden camera controls the relay device which is currently being connected to operate to block the connection to the user device, thereby operating to prevent the hidden camera by preventing the data from being transmitted from the user device suspected as the hidden camera to a remote place.

Further, in the present invention, when the user device connected to a specific relay device is detected as the hidden camera by specifying a relay device that is connectable by the user device, a specific area in the building corresponding to the specific relay device is automatically identified, and in addition to the detection of the hidden camera, the hidden camera provides information about the specific area in the building predetermined in response to the specific relay device which is currently being connected to a manager managing the building or provides the information to a service operator managing a plurality of different buildings through the service providing apparatus 100 to support the corresponding specific area to be intensively detected by the manager or the service operator, thereby supporting the corresponding hidden camera to be easily removed.

As described above, in the present invention, when the user device corresponding to the hidden camera is connected to the internal network in the building to maintain the connection state unnecessarily or generate abnormal traffic unnecessarily, the corresponding user device is detected as the hidden camera, thereby greatly reducing time and cost according to an inefficient detection method of the infrared method and the RF method in which it is necessary to closely observe the inside of the building with a narrow detection range one by one and it is difficult to limit an installation expected range of the hidden camera and supporting the hidden camera to be easily prevented by easily specifying an area where the hidden camera is suspected to be installed and supporting the intensive detection for the corresponding area.

Hereinafter, detailed operation examples of the service providing apparatus 100 and the relay device configuring the service providing system for preventing the hidden camera according to the embodiment of the present invention will be described with reference to the following drawings based on the aforementioned configuration.

Figure 2:
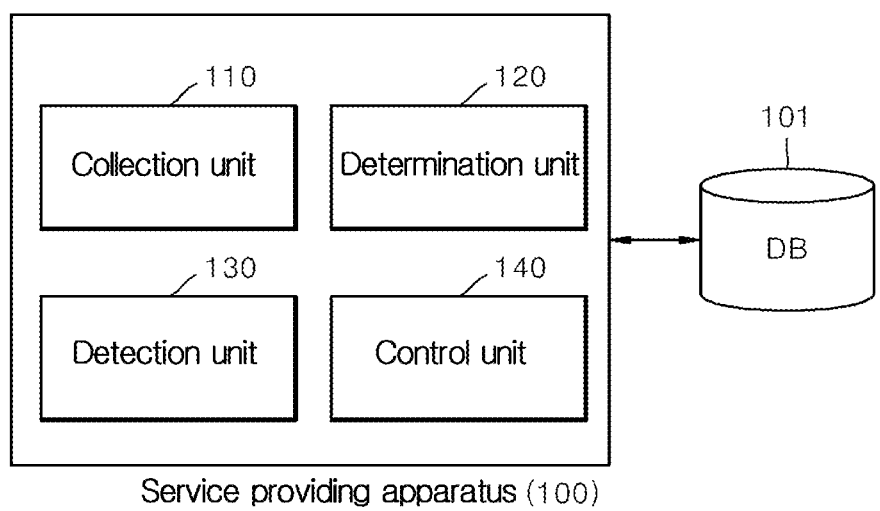
FIG. 2 is a configuration diagram of a service providing apparatus for preventing a hidden camera according to an embodiment of the present invention.

FIG. 2 is a configuration diagram of the service providing apparatus 100 according to the embodiment of the present invention. As illustrated in FIG. 2, the service providing apparatus 100 may be configured to include a collection unit 110, a determination unit 120, a detection unit 130, and a control unit 140.

At this time, the control unit 140 executes an overall control function of the service providing apparatus 100 by using programs and data pre-stored in the service providing apparatus 100. The control unit 140 may include a RAM, a ROM, a CPU, a GPU, and a bus, and the RAM, the ROM, the CPU, and the GPU may be connected to each other via a bus.

In addition, at least one of the components configured in the service providing apparatus 100 may be configured to be included in another component, for example, the collection unit 110, the determination unit 120, and the detection unit 130 may also be configured to be included in the control unit 140.

According to the aforementioned configuration, the collection unit 110 of the service providing apparatus 100 for preventing the hidden camera which communicates with the relay device in the building which is disposed in the interior of the building to relay the connection to the communication network via the communication network may receive and collect detection information including connection information of the user device connected to the specific relay device and identification information of the corresponding specific relay device periodically or in real time from the corresponding specific relay device.

That is, the relay device configured in the building generates the detection information including the connection information of the corresponding user device and the identification information of the relay device periodically or in real time from a connection time of the corresponding user device when the user device connected to the relay device is connected to transmit the generated detection information to the service providing apparatus 100 via the communication network.

At this time, one or more relay devices may be configured in the building, and the corresponding relay device may be configured as a gateway or an access point (AP).

Further, the relay device may also be connected to the communication network through another relay device configured in the building.

Further, the connection information of the user device included in the detection information may include the identification information of the user device, wherein the identification information of the user device may include an ID of the user device identified in the specific relay device, media access control (MAC) information of the user device, or the like.

At this time, the connection information of the user device may include a connection time to the specific relay device of the user device.

In addition, the identification information of the relay device included in the detection information to be transmitted from the relay device connected by the user device to the service providing apparatus 100 may include an ID, an IP address, MAC information, etc. of the relay device used in the internal network. At this time, the identification information of the relay device may be a BSSID.

Meanwhile, the determination unit 120 of the service providing apparatus 100 may determine whether the user device corresponds to an exception device by comparing the identification information of the user device included in the connection information according to the detection information received from the specific relay device with registration information by at least one exception device pre-registered in the service providing apparatus 100 as a device other than the hidden camera for the building.

That is, in the service providing apparatus 100, the registration information for each exception device which is the device other than the hidden camera for the specific building may be preset.

To this end, the service providing apparatus 100 may be configured to include a DB 101 that stores building information on the building, and the DB 101 may store building information for a plurality of different buildings.

At this time, the corresponding building information may include building identification information and registration information for each of one or more exception devices, and the corresponding exception device may include a relay device disposed in the building.

Here, building information stored in the DB by a plurality of different buildings may be set to different pieces of building identification information.

In addition, the registration information for each exception device includes identification information of the exception device, and the identification information of the corresponding exception device may include an ID of the exception device connected to the internal network, MAC information of the corresponding exception device, an IP address, etc.

In addition, in the registration information for each exception device included in the building information, arrangement information for an arrangement area (arrangement place) of the exception device in the building may be preset.

Further, the arrangement information may include area identification information for a specific area (place) configuring the building and a setting time for an available time of the specific area may be further set in the arrangement information. At this time, the area identification information may be configured as an identifier related to a room or a bedroom corresponding to each room when a plurality of rooms is configured in the building.

At this time, the room or bedroom-related identifier may be a room number (bedroom number) or a room name (bedroom name).

Further, when transmitting the detection information, the relay device may transmit building identification information for the corresponding building preset in the relay device while being included in the detection information to the service providing apparatus 100. The service providing apparatus 100 may check the building information on the building corresponding to the relay device transmitting the detection information through the building identification information in the DB 101.

In addition, the relay device may be connected to the other relay device configuring the internal network in the building through wired or wireless communication to transmit the detection information generated by the relay device to the service providing apparatus 100 through the other relay device.

Through this, the determination unit 120 of the service providing apparatus 100 may identify pre-stored building information corresponding to the detection information based on the building identification information included in the detection information, compare the registration information for each exception device included in the building information with the identification information of the user device included in the detection information, and determine the user device as a hidden camera detection target when there is no registration information of the exception device matched with the identification information of the user device (including the identification information matched with the identification information of the user device).

Further, the detection unit 130 of the service providing apparatus 100 may detect whether the user device corresponds to the hidden camera based on a setting time predetermined in response to the relay device transmitting the detection information or received and set from an external device when the user device corresponding to the detection information does not correspond to the exception device according to the determining result of the determination unit 120 and a connection maintenance time for the relay device (specific relay device) of the user device according to the connection information by at least one detection information collected for the user device by the collection unit 110 of the service providing apparatus 100.

For example, the detection unit 130 of the service providing apparatus 100 may collect connection information of the user device from a specific relay device connected by the user device periodically or in real time by the collection unit 110 when the user device does not correspond to the exception device.

Further, the detection unit 130 of the service providing apparatus 100 may match and cumulatively store the detection information including the connection information of the corresponding user device with the building information stored in the DB 101 in conjunction with the collection unit 110.

At this time, the detection unit 130 of the service providing apparatus 100 may match the identification information of the relay device according to the detection information among the registration information for each exception device included in the building information corresponding to the detection information with the registration information of the specific exception device including the matched identification information to store the matched information in the DB 101 when the user device does not correspond to the exception device.

Further, the detection unit 130 of the service providing apparatus 100 may identify the specific relay device connected by the user device according to the detection information received by the collection unit 110 in response to the user device based on the identification information of the relay device included in the detection information when the user device other than the exception device is determined by the determination unit 120.

Further, the detection unit 130 of the service providing apparatus 100 may identify the building information matched with the corresponding detection information in the DB 101 based on the building identification information included in the detection information or the identification information of the specific relay device.

Further, the detection unit 130 of the service providing apparatus 100 may identify the registration information of the exception device including the identification information of the specific relay device according to the detection information in the building information identified in the DB 101 in response to the detection information and identify a setting time set in response to the specific relay device in the corresponding registration information.

Further, the detection unit 130 of the service providing apparatus 100 may determine a connection maintenance time of the user device based on the connection information by at least one detection information corresponding to the user device which is matched and cumulatively stored with the building information in the DB 101.

At this time, the detection unit 130 of the service providing apparatus 100 may identify an initial connection time and a last connection time according to the detection information received later based on the connection information by at least one detection information corresponding to the specific user device and calculate a connection maintenance time for the specific relay device of the user device based on the initial connection time and the last connection time.

In addition, the detection unit 130 of the service providing apparatus 100 may cumulatively count the connection time according to the connection information included in the detection information whenever receiving the detection information corresponding to the specific user device based on the detection information by at least one connection device connected to the specific relay device received from the specific relay device periodically (e.g., at an interval of 1 min or 30 sec) in conjunction with the collection unit 110 to calculate the connection maintenance time for the specific user device as the result of the cumulative count.

That is, the relay device (specific relay device) generates detection information by different connection devices connected to the relay device periodically to transmit the generated detection information to the service providing apparatus 100. The detection unit 130 of the service providing apparatus 100 continues and cumulatively counts connection times according to the connection information included in the detection information whenever receiving the detection information corresponding to the user device among the detection information by at least one connection device received from the relay device and calculate the connection maintenance time summing all the connection times according to the cumulative count of the connection time in response to the user device.

Further, the detection unit 130 of the service providing apparatus 100 may detect the corresponding specific user device as the hidden camera when the corresponding connection maintenance time exceeds the setting time according to the arrangement information of the identified specific relay device corresponding to the detection information.

That is, the detection unit 130 of the service providing apparatus 100 may determine that the user deviates from the specific area while the user device is disposed in the corresponding specific area as it is without recovering the user device even though the user can no longer stay in the corresponding specific area when the connection of the user device is maintained by exceeding the setting time which is an available time of the corresponding specific area predetermined in response to the specific area of the building in which the relay device connected by the user device is disposed to detect that the user disposes (leaves) the user device suspected as the hidden camera in the corresponding specific area.

In addition, the detection unit 130 of the service providing apparatus 100 may receive setting information including identification information of a specific relay device configured in a building through a communication network from an external device or an identifier of a specific room corresponding to the corresponding specific relay device and located in the building and a setting time set in response to the identification information of the specific relay device or the identifier of the specific room.

Further, the detection unit 130 of the service providing apparatus 100 may change and update a first setting time according to the arrangement information included in the registration information of the exception device including the identification information of the specific relay device or the identifier of the specific room to a second setting time according to the setting information based on the corresponding setting information.

That is, the detection unit 130 of the service providing apparatus 100 may receive setting information for setting an available time of the specific area where the corresponding specific relay device is disposed in the interior of the building via the communication network from the manager terminal corresponding to the manager of the building or a KIOSK device configured in the building, identify building information matched with the corresponding setting information in the DB 101, and change the setting time set in the registration information of the exception device matched with the identification information of the specific relay device or the identifier of the specific room according to the setting information among the registration information for each exception device included in the building information to a setting time according to the setting information.

At this time, the setting information may include building identification information of the corresponding building.

Further, the detection unit 130 of the service providing apparatus 100 may identity an initial connection time of the user device based on the connection information according to the detection information collected in the DB 101 in response to the user device and determine a connection maintenance time of the user device based on the initial connection time on the basis of the connection information included by at least one detection information collected in the DB 101 in response to the user device.

At this time, the detection unit 130 of the service providing apparatus 100 may calculate the connection maintenance time in response to the corresponding user device whenever the detection information for the user device is received from the relay device and stored in the DB 101 in conjunction with the collection unit 110 of the service providing apparatus 100.

That is, the detection unit 130 of the service providing apparatus 100 may cumulatively count connection times according to the connection information included in the detection time whenever receiving the detection information corresponding to the user device based on the detection information for each connection device connected to the relay device received periodically from the relay device in conjunction with the collection unit 110 to calculate a connection maintenance time for the user device.

Further, the detection unit 130 of the service providing apparatus 100 may identify registration information of an exception device corresponding to identification information of a specific relay device which is being connected by the user device according to the detection information corresponding to the user device in the DB 101 and identify a setting time according to the arrangement information included in the registration information of the corresponding exception device.

Further, the detection unit 130 of the service providing apparatus 100 may compare the corresponding connection maintenance time with the setting time set in the registration information of the exception device corresponding to the specific relay device which is being connected by the user device whenever calculating the connection maintenance time in response to the user device to determine and detect that the user device is a device corresponding to the hidden camera when the connection maintenance time exceeds the setting time.

In addition to the aforementioned configuration, the relay device may transmit traffic (data amount) generated by the user device connected to the relay device to the service providing apparatus 100 to be included in the connection information included in the detection information corresponding to the user device and the collection unit 110 of the service providing apparatus 100 may match the corresponding detection information with the building information in the DB 101 to cumulatively store the matched detection information.

Accordingly, the detection unit 130 of the service providing apparatus 100 may identify connection information for each detection information which is periodically received from the specific relay device connected by the user device to be cumulatively stored in the DB 101 with respect to the user device which does not correspond to the exception device according to the determining result of the determination unit 120 and check (calculate) average traffic generated by the user device based on the traffic included in the connection information for each the detection information stored cumulatively for the user device.

Further, the detection unit 130 of the service providing apparatus 100 may detect that the corresponding user device is a device corresponding to the hidden camera (or suspected as the hidden camera) which continuously transmits an image having a lot of traffic when the corresponding average traffic is equal to or greater than a predetermined reference value.

On the other hand, in the above-described configuration, the detection unit 130 of the service providing apparatus 100 may generate detection information for determining whether the user device including the connection maintenance time calculated in response to the user device or the traffic generated by the user device is the hidden camera to transmit the generated detection information to a predetermined terminal.

At this time, the control unit 140 of the service providing apparatus 100 may also generate the detection information in conjunction with the detection unit 130 and the terminal to receive the detection information may be a manager terminal corresponding to the manager of the building in which the relay device connected by the user device is installed or an operator terminal corresponding to a service operator operating the service providing apparatus 100.

That is, the service providing apparatus 100 may provide the detection information for the connection state of the user device including the connection maintenance time or the traffic generation amount of the user device to the building manager or the service operator managing a plurality of buildings to provide the building manager or the service operator to directly determine whether the user device corresponds to the hidden camera based on the detection information.

Meanwhile, the control unit 140 of the service providing apparatus 100 may identify a specific relay device which is being connected by the user device based on the detection information including the identification information of the corresponding user device in the DB 101 when the user device is detected as the hidden camera in conjunction with the detection unit 130 of the service providing apparatus 100, generate control information including the identification information of the specific relay device and the identification information of the user device included in the corresponding detection information and for blocking the connection of the user device, and then transmit the generated control information to the corresponding specific relay device.

Accordingly, the specific relay device receiving the control information from the service providing apparatus 100 may identify the user device which is being connected to the relay device based on the identification information of the user device included in the control information and block the connection to the specific relay device of the corresponding user device.

At this time, when the building manager or the service operator checks the user device corresponding to the hidden camera based on the detection information or alarm information to be described below, the corresponding building manager or the service operator may also block the connection of the user device manually by directly operating the relay device connected by the user device corresponding to the hidden camera through the service providing apparatus 100 or operating directly the relay device.

Through the aforementioned configuration, the service providing apparatus 100 according to the embodiment of the present invention may determine a specific area in the building which is being used by the user of the user device based on the detection information transmitted by determining the connection of the user device in the corresponding relay device which is being connected by the user device connected to the specific relay device which configures the internal network of the building and relays the communication to the Internet network. In addition, the service providing apparatus 100 may identify an available time of the user of the user device for the corresponding specific area based on a predetermined setting time for the corresponding specific area, easily detect the user device in which the connection state to the specific relay device is maintained as the hidden camera by exceeding the corresponding setting time based on the detection information transmitted continuously from the specific relay device to the user device, and forcibly block the connection to the specific relay device of the user device detected as the hidden camera.

That is, according to the present invention, it is possible to induce the user to connect the user device only to one specific relay device corresponding to the specific area in the building and easily prevent the hidden camera by detecting the user device which is left in the building without being intentionally recovered by the user as the hidden camera even though the available time of the user for the specific area of the building is finished and the user cannot stay in the specific area.

Further, the service providing apparatus according to the embodiment of the present invention may detect the user device generating abnormal traffic based on traffic generated from the specific relay device by the user device connected to the specific relay device as the hidden camera and forcibly block the connection to the specific relay device of the user device detected as the hidden camera, thereby preventing the hidden camera.

Figure 3:
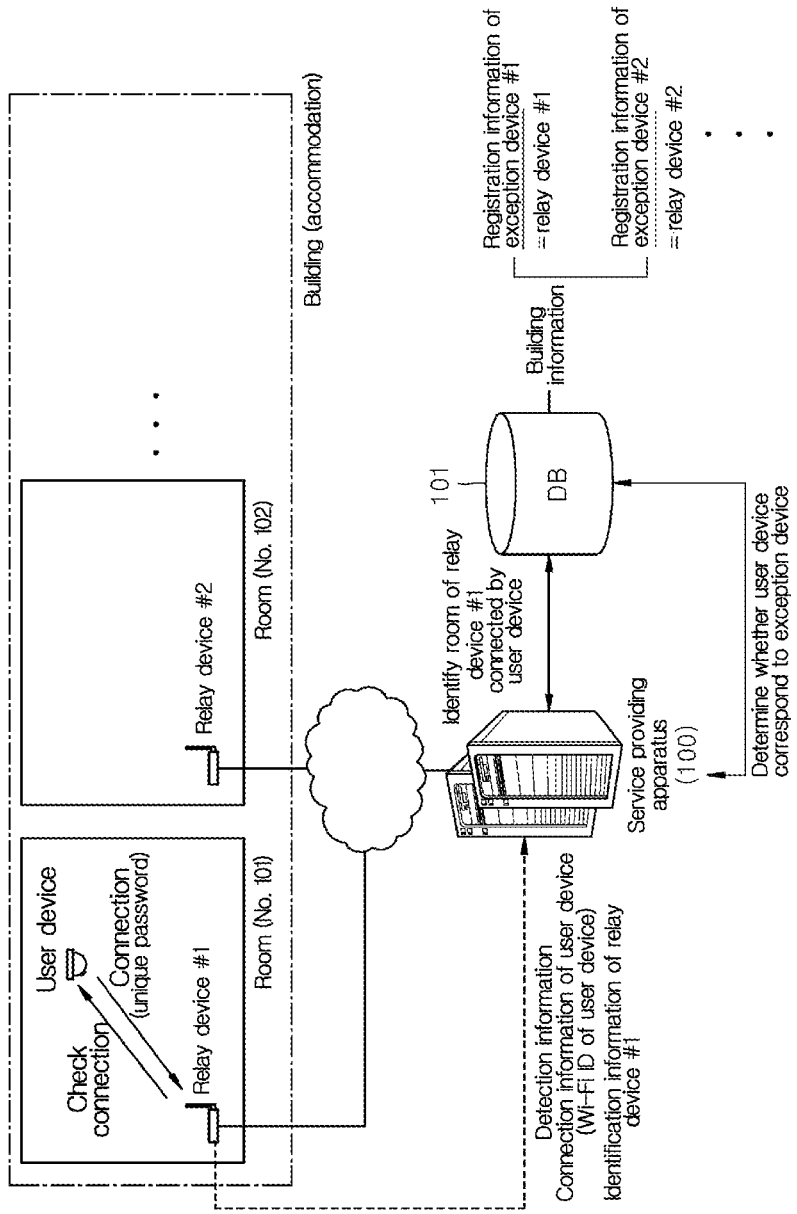
FIGS. 3 and 4 are operational exemplary diagrams of a service providing apparatus for preventing a hidden camera according to an embodiment of the present invention.
Figure 4:
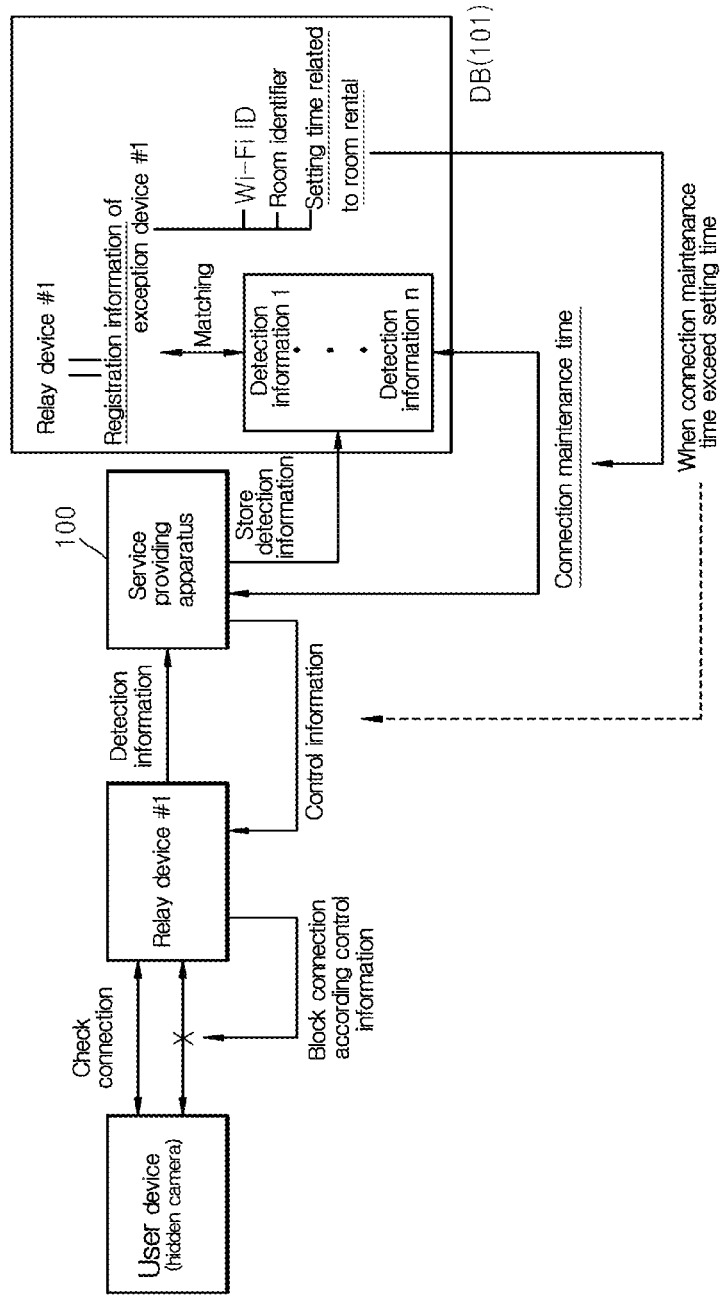

An application example of the service providing system for preventing the hidden camera including the service providing apparatus 100 according to the embodiment of the present invention will be described in detail with reference to FIGS. 3 and 4.

First, the aforementioned building is a building for an accommodation industry and a plurality of rooms may be configured (provided) in the building.

In addition, a relay device may be configured in each of the plurality of rooms, and the corresponding relay device may be directly connected to an Internet network or may be connected to the Internet network through the other relay device.

In addition, the relay device transmits request information for receiving a unique password to the user device connected to the relay device with the unique password predetermined for connection authentication of the user device connected to the corresponding relay device, and transmits authentication information including the corresponding unique password in response to the request information to allow the connection of the user device only for the authenticated user device.

At this time, as the relay device configured every room, a Wi-Fi AP will be described as an example and different unique passwords may be set between different relay devices.

Further, the user device may check a Wi-Fi ID or BSSID of a specific relay device configured in a specific room in which a user stays among a plurality of rooms configured in the building and a relay device configured outside the specific room during Wi-Fi activation. The manager of the building may provide only a unique password for the corresponding specific relay device to the user to induce the user device to be connected to the internal network in the building only through the specific relay device configured in the specific room in which the user stays to use the Internet network.

Further, the service providing apparatus 100 may include the DB 101 in which the building information for the corresponding building is stored as described above, wherein the corresponding building information may include registration information for each exception device in which each of the plurality of relay devices disposed in the building is set as the exception device described above.

In addition, area identification information including an identifier of the corresponding specific room may be set in the registration information of the exception device corresponding to the relay device disposed in the specific room among the registration information for each corresponding exception device.

That is, an identifier for a room in which a relay device is disposed for each relay device disposed in the room may be set in the registration information of the exception device corresponding to the relay device.

In addition, as described above, the registration information for each exception device may include identification information of the relay device corresponding to the exception device, wherein the identification information of the relay device includes a Wi-Fi ID (BSSID), MAC information, etc. of the relay device.

Through this, in the registration information of the exception device corresponding to the specific relay device, the identification information of the specific relay device and the identifier of the room in which the specific relay device is disposed may be matched with each other and set.

Based on the above-described configuration, when the user disposes the hidden camera in a specific room in which the user has stayed, the user can know only the unique password of the specific relay device disposed in the room in which the user has stayed, so that the user device may be connected to only the specific relay device disposed in the corresponding specific room to be connected to the internal network in the building.

Accordingly, the specific relay device disposed in the specific room in which the user has stayed may transmit request information for authentication request to the user device when the user device, which is the hidden camera, is connected to the corresponding specific relay device and receive authentication information from the user device in response to the corresponding request information.

Further, the specific relay device authenticates the user device when a unique password predetermined in the relay device and the authentication information are compared with each other and then matched with each other and then allows the connection of the user device.

Further, the specific relay device may be connected to the internal network in the building to be connected to the Internet network and may relay the connection to the Internet network in the user device connected to the corresponding specific relay device.

At this time, the specific relay device may communicate with the corresponding user device by a well-known wired/wireless communication method.

Meanwhile, when the specific relay device is connected to the corresponding user device, the specific relay device may generate detection information including connection information of the corresponding user device and identification information of the relay device to transmit the generated detection information to the service providing apparatus 100 through the Internet network connected to the predetermined service providing apparatus 100 via the internal network in the building.

At this time, the specific relay device may be directly connected to the Internet network to transmit the corresponding detection information to the service providing apparatus 100, or transmit the detection information to the service providing apparatus 100 through another relay device.

Further, the specific relay device may generate detection information in real time or periodically to transmit the generated detection information to the service providing apparatus 100.

Meanwhile, the service providing apparatus 100 may receive the detection information and identify identification information of the specific relay device included in the detection information or building information including information matching the building identification information from the DB 101.

Further, the service providing apparatus 100 may compare the registration information for each exception device included in the corresponding building information with the identification information of the user device included in the corresponding detection information to determine whether the corresponding user device corresponds to the exception device in which the connected to the internal network in the building is always allowed.

That is, the service providing apparatus 100 may determine that the corresponding user device is not the exception device when there is no registration information of the exception device which is set with identification information matched with the identification information of the user device included in the detection information in the building information identified in response to the detection information.

Further, the service providing apparatus 100 may identity the specific relay device based on the identification information of the specific relay device which is connected by the user device which is included in the detection information and determined to be not the exception device and identify a specific room corresponding to the specific relay device in which the user stays based on the identifier of the specific room included in the registration information of the specific exception device corresponding to the specific relay device.

At this time, the identifier of the specific room may be a room number or a bedroom number.

Further, the service providing apparatus 100 may check a setting time which is an available time which is preset in the registration information of the corresponding specific exception device and available for the corresponding specific room.

In addition, the service providing apparatus 100 may match one or more pieces of detection information received from the specific relay device periodically or in real time with building information identified in response to the detection information and store the matched detection information in the DB 101 or match the detection information with the registration information of the specific exception device corresponding to the detection information among the registration information for each exception device included in the building information to cumulatively store the matched detection information in the DB 101.

Further, the service providing apparatus 100 may check an initial connection time of the user device based on the detection information corresponding to the user device which is cumulatively stored in the DB 101.

Further, the service providing apparatus 100 may calculate a connection maintenance time for the corresponding specific relay device of the user device based on the corresponding initial connection time on the basis of the detection information corresponding to the user device which is cumulatively stored in the DB 101.

At this time, the service providing apparatus 100 may calculate a connection maintenance time of the user device whenever receiving the detection information associated with the user device.

Further, the service providing apparatus 100 may determine whether the connection maintenance time exceeds the setting time by comparing the setting time and the connection maintenance time based on the initial connection time whenever receiving the detection information.

At this time, the service providing apparatus 100 may also calculate the connection maintenance time for the user device by cumulatively counting connection times according to the connection information included in the detection information whenever receiving the detection information corresponding to the user device based on the detection information for each connection device connected to the relay device which is periodically received from the relay device and determine whether the connection maintenance time exceeds the setting time whenever calculating the connection maintenance time.

Further, the service providing apparatus 100 may determine that the user has left the user device in the corresponding specific room without recovering the user device even though the use for the specific room of the user is finished when the connection maintenance time calculated for the user device exceeds a setting time predetermined in response to the checked specific room for the user device and in this case, may detect the user device as the hidden camera.

Further, the service providing apparatus 100 may extract identification information of the user device and identification information of the specific relay device which is being connected by the user device based on the detection information received for the user device detected as the hidden camera and generate control information including the identification information of the specific relay device and the identification information of the user device and for controlling the corresponding specific relay device so as to block the connection of the user device in the corresponding specific relay device to transmit the generated control information to the corresponding specific relay device via the communication network.

At this time, the identification information of the user device included in the control information may be Wi-Fi ID or MAC information provided by the user device in the specific relay device, and the identification information of the specific relay device included in the corresponding control information may include an IP address, a Wi-Fi ID (BSSID), and MAC information of the specific relay device.

Meanwhile, the specific relay device receiving the control information from the service providing apparatus 100 via the communication network may identify a user device connected to the relay device based on the identification information of the user device included in the control information, and block the connection of the corresponding user device suspected as the hidden camera based on the control information received from the service providing apparatus 100.

Through this, the service providing apparatus 100 may block the connection to the corresponding specific relay device of the user-related user device suspected as the hidden camera which has maintained the connection to the specific relay device even after the rental for the specific room of the user is finished to prevent the hidden camera easily without the need to perform the detecting process using a separate device for detecting the hidden camera in the related art.

Meanwhile, the service providing apparatus 100 may identity the detection information received for the user device detected as the hidden camera through the detection process for the hidden camera in the DB 101 and identify an identifier of the specific room where the specific relay device connected by the user device is disposed based on the identification information of the specific relay device included in the corresponding detection information on the basis of the registration information of the exception device corresponding to the specific relay device.

Further, the service providing apparatus 100 may generate alarm information including the identifier of the specific room identified in response to the detection information when detecting the hidden camera and identify a contact address of the manager terminal predetermined in the building information of the building where the specific relay device connected by the user device is located, and then transmit the corresponding alarm information to the manager terminal corresponding to the corresponding contact address.

Through this, the service providing apparatus 100 may generate alarm information specifying a specific room in the building where the user device suspected as the corresponding hidden camera is disposed when detecting the user device suspected as the hidden camera to notify the generated alarm information to the manager, thereby supporting the manager to find and remove easily the hidden camera by examining the corresponding specific room.

That is, the service providing apparatus 100 may limit and specify a place where the hidden camera is disposed among the plurality of rooms configuring the building to a specific room based on the detection information transmitted from the relay device. As a result, the service providing apparatus 100 supports the manager to limit and examine an examination range for the hidden camera to one room without the need to examine all rooms in the building, thereby reducing efforts and costs for detecting the hidden camera.

At this time, the service providing apparatus 100 may also transmit the alarm information to a terminal corresponding to the service operator of the service providing apparatus 100 when detecting the user device suspected as the hidden camera and also support the user device suspected as the hidden camera to be notified to the manager by the service operator.

Figure 5:
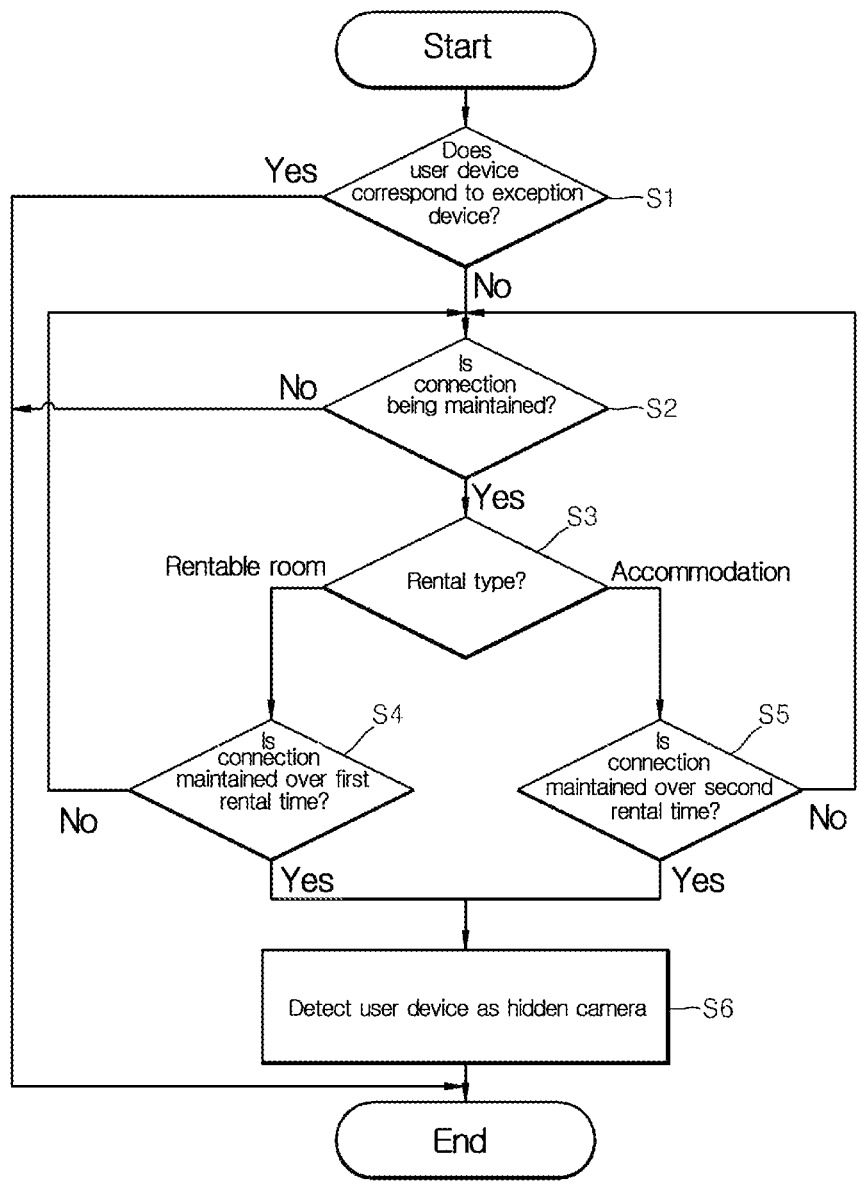
FIG. 5 is an operational flowchart relating to detecting a hidden camera for a building operating an accommodation industry of a service providing apparatus for preventing a hidden camera according to an embodiment of the present invention.

Meanwhile, in the aforementioned configuration, the service providing apparatus 100 may receive rental information including a rental type (rental form) according to a specific room rental of the user from the external device or reservation information including the corresponding rental type and for reserving the specific room and detect whether the user device is the hidden camera by differently setting the connection maintenance time of the user device and the setting time which is a compared target according to the rental type. This will be described in detail with reference to a flowchart of FIG. 5.

Further, in the service providing apparatus 100, a plurality of different rental types may be set and different rental times for the plurality of different rental types may be preset.

For example, the plurality of different rental types may include a rentable room and accommodation.

In addition, in the service providing apparatus 100, 4 hours may be preset as a rental time in response to a first rental type corresponding to the rentable room, and 24 hours may be set as a rental time in response to a second rental type corresponding to the accommodation.

At this time, in the service providing apparatus 100, a predetermined check-out time of a next day may be set as the rental time based on the day in response to the second rental type corresponding to the accommodation and correspond to the second rental type corresponding to the accommodation, and for example, 11 a.m. of the next day may be set as the rental time in response to the second rental type corresponding to the accommodation.

Further, the service providing apparatus 100 may communicate with an external device via the communication network, and the corresponding external device may be connected to the Internet network through the relay device configured in the building and communicate with the service providing apparatus 100 via the communication network including the corresponding Internet network.

At this time, the external device may be a KIOSK device configured (installed) in the building, and the corresponding KIOSK device may generate rental information including a rental type for a specific room and an identifier of the room based on user input when the user stays in the specific room to transmit the generated rental information to the service providing apparatus 100 via the communication network.

Further, the external device may be a manager terminal managing the plurality of rooms in the building and the manager terminal may generate the aforementioned rental information when the user stays in the specific room to transmit the generated rental information to the service providing apparatus 100 via the communication network.

In addition, the rental information generated by the external device may include building identification information (a building ID, a building name, a building address, etc.) of the building to which the specific room to be rented belongs, and include user information (a name, a contact address, etc.) of the user using the specific room.

In addition, the external device may generate reservation information for reserving a room by communicating with a customer terminal of the user who is a customer using the room via the communication network to transmit the generated reservation information to the service providing apparatus 100, wherein the reservation information may also include building identification information, user information, a rental type, a room identifier, and the like.

That is, the external device may transmit rental information generated based on input information input by the user when the customer corresponding to the user stays in the specific room or the reservation information for reserving the room generated through the communication with the customer terminal of the customer to the service providing apparatus 100 via the communication network.

According to the aforementioned configuration, the service providing apparatus 100 may identify specific building information corresponding to the corresponding rental information in the DB 101 when receiving the rental information or the reservation information from the external device and identify registration information of a specific exception device where an identifier matched with the identifier of the room set in the rental information or the reservation information among the registration information for each exception device included in the specific building information and then match the rental information or the reservation information with the registration information of the corresponding specific exception device to store the rental information or the reservation information in the DB 101.

At this time, the service providing apparatus 100 may generate room status information including the rental information by the plurality of rooms corresponding to the specific building information and the connection information for each connection device connected to the relay device matched with the room in response to the specific building information to output the room status information on one screen by a predetermined output device.

Here, the service providing apparatus 100 may include and output the building identification information included in the specific building information in the room status information.

Through this, the service providing apparatus 100 may provide the room status information for a rental status for each room and a status of at least one connection device connected to the relay device configured for each room through one screen. Accordingly, the service providing apparatus 100 may support the service operator managing the service providing apparatus 100 to intuitively determine the rental status for each room by one or more different buildings and the status of the connection devices connected to the relay device configured for each room.

Further, the service providing apparatus 100 may identify registration information of the specific relay device (registration information of the specific exception information) connected by the user device according to the detection information by comparing the corresponding detection information with the registration information for each exception device when receiving the detection information from the specific relay device and determine whether the rental information or the reservation information matched with the registration information of the corresponding specific relay device exists in the DB 101.

Further, when there is the rental information or the reservation information which is matched with the registration information of the specific relay device connected by the user device and the corresponding user device is not the exception device (S1), the service providing apparatus 100 may change the setting time to be compared with the connection maintenance time to a predetermined rental time in response to the rental type included in the rental information or the reservation information when comparing the connection maintenance time and the setting time according to the connection information by the detection information collected for the user device (S2 and S3) to compare the changed setting time with the connection maintenance time calculated whenever receiving the detection information for the user device (S4 and S5).

At this time, the service providing apparatus 100 may determine that the connection to the specific relay device of the user device is finished when the detection information is not received from the specific relay device connected by the user device any longer before the connection maintenance time calculated for the user device exceeds the setting time.

For example, the service providing apparatus 100 may calculate a connection maintenance time based on the connection information for each detection information received from the specific relay device for the user device connected to the specific relay device disposed in the specific room in the building and set 4 hours which is a first rental time predetermined for a rental type of 'rentable room' as a setting time to be compared with the connection maintenance time (S4) when the user selects a rental type of the corresponding specific room as 'rentable room' according to the rental information received from the external device for the specific room (S3).

At this time, even when a predetermined setting time for the registration information of the specific exception device which is the specific relay device corresponding to the corresponding specific room is 24 hours, since the user of the user device rents a specific room as the rental type corresponding to 'rentable room', the service providing apparatus 100 may change a setting time, at which the user device of the user allows the connection to the specific relay device in the corresponding specific room, from 24 hours to 4 hours to compare the changed setting time with the connection maintenance time calculated for the user device.

As another example, the service providing apparatus 100 may calculate a connection maintenance time based on the connection information for each detection information received from the specific relay device for the user device connected to the specific relay device disposed in the specific room in the building and set 24 hours which is a second rental time predetermined for a rental type of 'accommodation' as a setting time to be compared with the connection maintenance time (S5) when the user selects the rental type of the corresponding specific room as 'accommodation' according to the rental information received from the external device for the specific room (S3).

Further, when the connection maintenance time exceeds the setting time (rental time while the connection to the specific relay device of the user device is maintained by comparing the connection maintenance time calculated based on the connection information for each detection information collected for the user device with the setting time changed to the rental time according to the rental information or the reservation information (S4 and S5), the service providing apparatus 100 may detect the corresponding user device as the hidden camera (S6) and transmit control information for blocking the connection to the specific relay device of the user device detected as the hidden camera.

Further, the service providing apparatus 100 may generate alarm information for the user device detected as the hidden camera as described above to transmit the generate alarm information to the manager terminal.

In the aforementioned configuration, the service providing apparatus 100 may identify that the connection to the specific relay device of the user device is finished and then re-connected according to the connection information for each detection information collected for the user device and calculate a connection maintenance time based on an initial connection timing (initial connection time) according to the connection information included in the detection information received first among the detection information received before a connection end time which is a start time of the connection maintenance time when the time from the connection end time to the re-connection time of the user device is equal to or smaller than a predetermined reference value.

That is, the service providing apparatus 100 may calculate the connection maintenance time by regarding a time from a connection failure time to the re-connection time to the specific relay device of the user device when the user device as the hidden camera is re-connected by solving problems such as rebooting after the connection with the specific relay device is failed due to a temporary problem.

At this time, the service providing apparatus 100 may cumulatively count connection times according to the connection information included in the detection time whenever receiving the detection information corresponding to the user device based on the detection information for each connection device connected to the relay device received periodically from the relay device to calculate a connection maintenance time of the user device which is reflected up to the temporary connection failure time.

As described above, according to the present invention, it is possible to determine a room rental time of a user according to a room rental type of the user, determine that the user deviates from the building while the user device is left in the rental room in the building when the user device maintains the connection state to the specific relay device of the room in the building by exceeding the corresponding room rental time, detect the user device left in the room as the hidden camera by exceeding the room rental time, thereby supporting crimes caused by the hidden camera to be prevented in advance by supporting the hidden camera to be detected and then automatically blocked immediately after the rental time is finished according to the room rental type of the user.

Further, according to the present invention, when the user device connected to the relay device in the building generates a lot of abnormal traffic, the user device is determined as the hidden camera which continuously transmits images to the outside to support the hidden camera to be automatically blocked.

As described above, according to the present invention, existing accommodations may support the hidden camera to be efficiently detected while a current network system is maintained as it is, and new accommodations may support the hidden camera using a network of the accommodation to be efficiently detected in the same form as the existing network configuration.

Further, according to the present invention, it is possible to automatically disable the hidden camera by blocking the image transmission of the hidden camera by automatically blocking the connection to the communication network of the user device detected as the hidden camera connected to the relay device in the building, thereby supporting prevention of the hidden camera.

Further, according to the present invention, it is possible to support intensive detection for the corresponding room to be performed by providing information about a room suspected of having a hidden camera installed to a manager, thereby improving detection efficiency and reducing efforts and costs required for detection.

Further, according to the present invention, it is possible to support criminals who have committed crimes due to installation of the hidden camera to be arrested by supporting an installation time of the hidden camera and a criminal installing the hidden camera to be checked through information associated with a user of a specific room by limiting the relay device to which the hidden camera may be connected to the specific relay device of the specific room, thereby supporting crimes caused by the hidden camera to be reduced socially.

Figure 6:
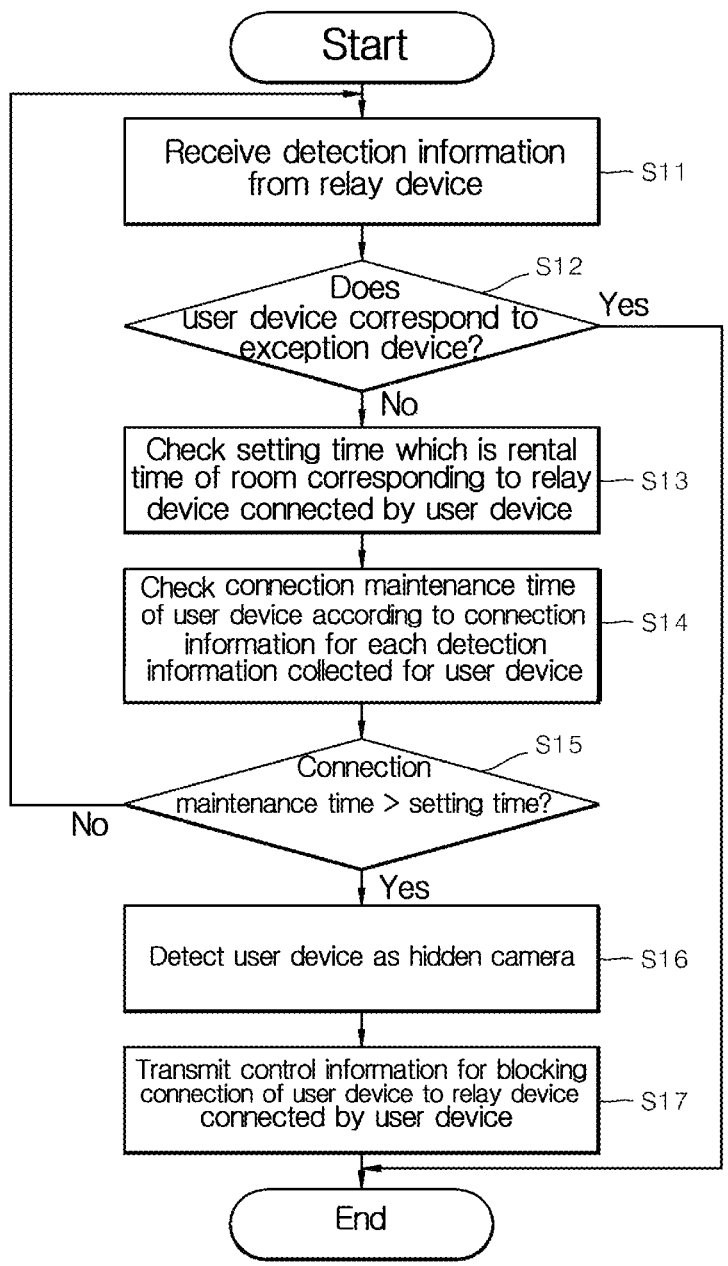
FIG. 6 is a flowchart of a service providing method for preventing a hidden camera according to an embodiment of the present invention.

FIG. 6 is a flowchart for a service providing method for preventing a hidden camera of the service providing apparatus 100 which is disposed in the interior of the building and communicates with the relay device relaying the communication network connection via the communication network according to the embodiment of the present invention.

As illustrated in FIG. 6, the service providing apparatus 100 may receive and collect detection information including connection information of the user device connected to the relay device and identification information of the relay device periodically or in real time from the relay device (S11).

Further, the service providing apparatus 100 may compare the identification information of the user device included in the connection information according to the detection information with registration information by one or more exception devices pre-registered as a device other than a hidden camera for the building to determine whether the user device corresponds to the exception device (S12).

Further, the service providing apparatus 100 may calculate traffic generated by the user device or a connection maintenance time of the user device based on the connection information for each detection information collected for the user device in the collection step when the user device does not correspond to the exception device and then calculate a determining result by applying the calculated traffic or connection maintenance time to a predetermined determination reference to detect the hidden camera, and detect whether the user device corresponds to the hidden camera according to the determining result.

As an example, the service providing apparatus 100 may check a setting time which is preset in response to the relay device connected by the user device or received and set from an external device and a connection maintenance time of the user device according to the connection information for each detection information collected for the user device when the user device does not correspond to the exception device as the determining result of whether the user device corresponds to the exception device (S13 and S14), and compare the corresponding setting time and the connection maintenance time (S15) to detect whether the user device corresponds to the hidden camera (S16).

In this case, the setting time may be a rental time which is preset for a room corresponding to the relay device connected by user device or set by the information received from the external device.

As another example, the service providing apparatus 100 may also detect whether the user device corresponds to the hidden camera based on the traffic generated by the user device according to the connection information for each detection information.

More specifically, the service providing apparatus 100 may calculate average traffic generated by the user device based on the traffic included in the connection information for each detection information received from the relay device connected by the user device and then detect whether the user device corresponds to the hidden camera according to whether the average traffic exceeds a predetermined reference value.

Further, the service providing apparatus 100 may transmit control information for blocking the connection of the user device to the relay device connected by the user device when the user device is detected as the hidden camera (S17).

The user device, the relay device, and the service providing apparatus 100 described above may be implemented by hardware components, software components, and/or a combination of the hardware components and the software components.

In addition, the components described in the embodiments may be implemented by using one or more general purpose computers or special purpose computers, such as a processor, a controller, an arithmetic logic unit (ALU), a digital signal processor, a microcomputer, a field programmable array (FPA), a programmable logic unit (PLU), a microprocessor, or any other device capable of executing and responding to instructions.

The user device, the relay device, and the service providing apparatus 100 may execute an operating system (OS) and one or more software applications executed on the OS.

In addition, the user device, the relay device, and the service providing apparatus 100 may access, store, manipulate, process, and generate data in response to execution of software.

For convenience of understanding, although each component is described to be used one by one, it can be seen by those skilled in the art that a processing device may include a plurality of processing elements and/or a plurality of types of processing elements.

For example, the user device, the relay device, and the service providing apparatus 100 may include a plurality of processors or a processor and a controller. In addition, other processing configurations, such as parallel processors, are possible.

Software may include a computer program, a code, an instruction, or a combination of one or more thereof, and allow the user device, the relay device, and the service providing apparatus 100 to operate as desired or to be commanded independently or collectively.

The software and/or data may be interpreted by the user device, the relay device, and the service providing apparatus 100, or permanently or temporarily embodied in any type of machine, a component, a physical device, virtual equipment, a computer readable storage medium or device, or a signal wave to be transmitted, in order to provide instructions or data to the user device, the relay device, and the service providing apparatus 100.

The software may be distributed on a computer system connected to a network and stored or executed in a distributed manner. The software and data may be stored in one or more computer-readable recording media.

The service providing method for preventing the hidden camera according to the embodiment of the present invention described in the above-described embodiment can be prepared with a computer program, and codes and code segments constituting the computer program can be easily inferred by a computer programmer in the art. In addition, the corresponding computer program is stored in computer readable media, and is read and executed by a computer or the relay device, the service providing apparatus 100, etc. according to the embodiment of the present invention to implement the service providing method for preventing the hidden camera according to the embodiment of the present invention.

The computer readable media include a magnetic recording medium and an optical recording medium. The computer program for implementing the service providing method for preventing the hidden camera according to the embodiment of the present invention may be stored and installed in internal memories of the relay device and the service providing apparatus 100. Alternatively, an external memory such as a smart card that stores and installs the computer program for implementing the service providing method for preventing the hidden camera according to the embodiment of the present invention may be mounted on the relay device and the service providing apparatus 100 through an interface.

Various apparatuses and components described in the present specification may be embodied by a hardware circuit (for example, a CMOS based logic circuit), firmware, software, or combinations thereof. For example, the apparatuses and components may be embodied by using a transistor, a logic gate, and an electronic circuit in the forms of various electric structures.

The aforementioned contents can be corrected and modified by those skilled in the art without departing from the essential characteristics of the present invention. Accordingly, the various embodiments disclosed in the present invention are not intended to limit the technical spirit but describe the present invention and the technical spirit of the present invention is not limited by the following embodiments. The protection scope of the present invention should be construed based on the following appended claims and it should be appreciated that the technical spirit included within the scope equivalent to the claims belongs to the present invention.

What is claimed is:

1. A service providing method for preventing a hidden camera of a service providing apparatus communicating with a relay device which is disposed in the interior of a building to relay a communication network connection via a communication network, the service providing method comprising:

a collection step of receiving and collecting detection information including connection information of a user device connected to the relay device and identification information of the relay device periodically or in real time from the relay device;

a determination step of comparing the identification information of the user device included in the connection information according to the detection information with registration information by one or more exception devices pre-registered as a device other than a hidden camera for the building to determine whether the user device corresponds to the exception device; and a detection step of calculating traffic generated by the user device or a connection maintenance time of the user device based on the connection information for each detection information collected for the user device in the collection step when the user device does not correspond to the exception device in the determination step and then calculating a determining result by applying the calculated traffic or connection maintenance time to a predetermined determination reference to detect the hidden camera, and detecting whether the user device corresponds to the hidden camera according to the determining result, wherein the detection step includes detecting whether the user device corresponds to the hidden camera based on a setting time which is predetermined in response to the relay device or received or set from an external device and the connection maintenance time of the user device according to the connection information for each detection information collected for the user device in the collection step or calculating average traffic generated by the user device based on the traffic included in the connection information for each detection information and then detecting whether the user device corresponds to the hidden camera according to whether the average traffic exceeds a predetermined reference value.

2. The service providing method of claim 1, further comprising:

transmitting control information for blocking the connection of the user device to the relay device when the user device corresponds to the hidden camera in the detection step.

3. The service providing method of claim 1, wherein the relay device is a gateway or an AP.

4. The service providing method of claim 1, wherein the building is a building including a plurality of rooms for an accommodation industry, a plurality of different relay devices, which are matched with the plurality of rooms one by one and set with different unique passwords for connection authentication, is arranged in the interior of the building, and an identifier of a specific room where a specific relay device is disposed among the plurality of rooms is set in registration information of the exception device corresponding to the specific relay device connected by the user device among the plurality of relay devices.

5. The service providing method of claim 4, wherein in the detection step, the service providing apparatus identifies an identifier of a specific room where the specific relay device connected by the user device is disposed based on the identification of the specific relay device included in the detection information according to the registration information of the exception device corresponding to the specific relay device and generates alarm information including the identifier of the specific room identified in response to the detection information when detecting the hidden camera to transmit the generated alarm information to one or more terminals predetermined in response to the building.

6. The service providing method of claim 4, wherein in the service providing apparatus, a rental type for each rental type is preset, and the detection step further comprises detecting the user device as the hidden camera when the connection maintenance time of the user device from an initial connection time to the specific relay device of the user device according to the connection information exceeds a rental time by setting the rental time according to a rental type of a customer who stays in the specific room among the plurality of rooms to the setting time or detecting the user device as the hidden camera when a connection maintenance time of the user device exceeds the rental time, wherein the connection maintenance time is calculated by cumulatively counting connections times according to the connection information included in the detection information whenever receiving the detection information corresponding to the user device based on the detection information by one or more connection devices connected to the specific relay device which is periodically received from the specific relay device.

7. The service providing method of claim 6, wherein the external device is a KIOSK device installed in the building or a manager terminal corresponding to a manager of the building, before the collection step, further comprising setting, by the service providing apparatus, a rental time according to the rental type based on rental information or reservation information whenever the rental information for the specific room generated by the external device based on input information input when the customer stays or the reservation information for reserving a room generated by communicating with a customer terminal of the customer is received from the external device.

8. The service providing method of claim 7, wherein the collection step further comprises generating room status information including the rental information by the plurality of rooms and the connection information for each connection device connected to the relay device matched with the room and output the room status information on one screen by a predetermined output device.

* * * * *